United States Patent
Mitake (10) Patent No.: US 9,838,055 B2
(45) Date of Patent: Dec. 5, 2017

(54) DIRECTIONAL COUPLER AND WIRELESS COMMUNICATION DEVICE

(71) Applicant: TDK Corporation, Tokyo (JP)

(72) Inventor: Yukio Mitake, Tokyo (JP)

(73) Assignee: TDK Corporation, Tokyo (JP)

( * ) Notice: Subject to any disclaimer, the term of this patent is extended or adjusted under 35 U.S.C. 154(b) by 12 days.

(21) Appl. No.: 15/042,451

(22) Filed: Feb. 12, 2016

(65) Prior Publication Data

US 2016/0268668 A1    Sep. 15, 2016

(30) Foreign Application Priority Data

Mar. 11, 2015    (JP) .................................. 2015-048582

(51) Int. Cl.
*H01P 5/18*    (2006.01)
*H04B 1/16*    (2006.01)

(52) U.S. Cl.
CPC ............... *H04B 1/16* (2013.01); *H01P 5/184* (2013.01)

(58) Field of Classification Search
CPC ... H01Q 1/50; H01P 1/22; H01P 1/213; H01P 3/08; H01P 5/10; H01P 5/12; H01P 5/16; H01P 5/18; H01P 5/184; H03H 11/16; H04B 1/04; H04B 1/16; H04B 1/44; H04B 1/46; H04B 1/0475
USPC .......... 333/25, 101, 109, 110, 112, 116, 156, 333/161, 246; 343/850; 375/219, 375/295–297; 455/78, 82, 127.1
See application file for complete search history.

(56) References Cited

U.S. PATENT DOCUMENTS

| | | | |
|---|---|---|---|
| 6,483,398 B2 | 11/2002 | Nagamori et al. | |
| 6,747,525 B2 | 6/2004 | Iida et al. | |
| 6,972,640 B2 | 12/2005 | Nagamori et al. | |
| 7,508,283 B2 * | 3/2009 | Itoh ........................ | H01P 5/227 333/109 |
| 7,567,147 B2 * | 7/2009 | Toujo ...................... | H01P 5/185 333/116 |
| 7,907,032 B2 * | 3/2011 | Yamamoto ................ | H01P 5/18 333/116 |

(Continued)

FOREIGN PATENT DOCUMENTS

| | | |
|---|---|---|
| JP | 2002-43813 A | 2/2002 |
| JP | 2002-280810 | 9/2002 |
| JP | 2005-151179 A | 6/2005 |

*Primary Examiner* — Shawkat M Ali
(74) *Attorney, Agent, or Firm* — Oblon, McClelland, Maier & Neustadt, L.L.P.

(57) ABSTRACT

A directional coupler including a main line, a sub-line, an input terminal, an output terminal, a coupling terminal and an isolation terminal, wherein the main line includes a first main-line section formed on a first layer, and a second main-line section formed on a second layer; the first and the second main-line sections are connected in parallel between the input and the output terminals; the sub-line includes a first sub-line section formed on the first layer, and a second sub-line section formed on the second layer; the first and the second sub-line sections are connected in parallel between the coupling and the isolation terminals; the first main-line section and the first sub-line section are disposed in close proximity to each other to generate electromagnetic coupling; and the second main-line section and the second sub-line section are disposed in close proximity to each other to generate electromagnetic coupling.

16 Claims, 8 Drawing Sheets

(56) References Cited

U.S. PATENT DOCUMENTS

| | | | |
|---|---|---|---|
| 2004/0203552 A1* | 10/2004 | Horiuchi | H04B 1/48 455/333 |
| 2006/0066418 A1* | 3/2006 | Podell | H01P 5/187 333/116 |
| 2012/0161897 A1* | 6/2012 | Tamaru | H01P 1/20345 333/110 |
| 2012/0194293 A1* | 8/2012 | Dupont | H01P 5/184 333/109 |
| 2013/0194055 A1* | 8/2013 | Mitake | H01P 5/185 333/116 |
| 2014/0085019 A1 | 3/2014 | Mei et al. | |

* cited by examiner

DIRECTIONAL COUPLER AND WIRELESS COMMUNICATION DEVICE

BACKGROUND OF THE INVENTION

The present invention relates to a directional coupler and a wireless communication device, and particularly, to technologies for designing particular conductor patterns within a laminate which forms part of a directional coupler, thereby improving the characteristics of the directional coupler.

A directional coupler (hereinafter sometimes referred to as the "coupler") for extracting part of electric power propagated through a transmission line is an indispensable part for constructing a transmission circuit for a variety of wireless communication devices such as a mobile phone, a wireless LAN communication device, a communication device conforming to the Bluetooth (registered trademark) standard, and the like.

Specifically, a coupler forms part of adjusting means for controlling a transmission signal to keep its level constant, and this adjusting means comprises a power amplifier (hereinafter sometimes referred to as the "PA") capable of control a gain, a coupler for detecting the level of a transmission signal, and an automatic power control circuit (hereinafter sometimes referred to as the "APC circuit"). An input transmission signal is amplified by the PA, and then output through the coupler. The coupler supplies the APC circuit with a monitor signal which has a level corresponding to the level of the transmission signal output from the PA. The APC circuit controls the gain of the PA such that the output of the PA remains constant in accordance with the level of the monitor signal (i.e., the level of the transmission signal). The transmission output is stabilized by such feedback control of the PA.

The foregoing coupler comprises a main line and sub-line which are disposed in close proximity to each other to make electromagnetic coupling therebetween. The main line for transmitting a transmission signal comprises an input terminal at one end thereof, and an output terminal at the other end thereof, respectively. The sub-line for detecting the level of a transmission signal comprises a coupling terminal at one end thereof and an isolation terminal at the other end thereof, respectively. Then, part of a transmission signal transmitted through the main line is extracted by the sub-line, and is outputted to the APC circuit through the coupling terminal, as a monitor signal.

Such couplers are also provided in general as a one-chip component which comprises a main line, a sub-line, a variety of terminals, and the like arranged within a laminate which includes a plurality of conductor layers with an insulating layer interposed between the respective conductor layers.

Main characteristics of a coupler may include insertion loss, degree of coupling, isolation, and directivity. The insertion loss is a loss caused by the coupler, and is desired to be lower. The degree of coupling indicates the ratio of power propagating in a forward direction (direction from an input terminal to an output terminal of a main line) to power extracted to a coupling terminal. The isolation indicates a leakage of power propagating in a reverse direction (direction from the output terminal to the input terminal of the main line) to the coupling terminal, and is desired to be higher (a smaller leakage). The directivity, in turn, indicates the difference between isolation and degree of coupling, and a better coupler is defined to exhibit a higher directivity (larger absolute value), allowing for the formation of a satisfactory APC circuit with few detection errors.

Reference is made to JP-A-2002-280810 (Patent Document 1) which is a document related to such a coupler.

SUMMARY OF THE INVENTION

In the feedback control of the PA described above, the coupler is required to provide, as its main function, the Abilities to separate and detect travelling wave power (transmission power) delivered from the PA from reflected wave components generated from circuits at later stages, such as an antenna. Accordingly, the isolation, which is a characteristic indicative of the level of such abilities (the degree to which the travelling wave can be separated from the reflected wave) is desirably as high as possible in view of performing precise control.

Also, for providing a coupler as an electronic component, the coupler must satisfy requirements to characteristics (specifications required for the coupler) made from a user. In some cases, a coupler must satisfy two different required specifications (see reference numerals S1, S2 in FIGS. 9, 11, 13, later described) which are set, for example, to a lower and a higher region of frequencies with respect to the isolation characteristic, while ensuring a satisfactory coupling.

However, due to recent demands for a reduction in size and thickness and an increase in functionality of electronic components, and from the necessity of realizing a high productivity in mass production without variations in quality and accuracy, it is not always easy to simultaneously satisfy required characteristics for coupling and isolation. In this regard, a specific description will be given in the following.

Figure 6:
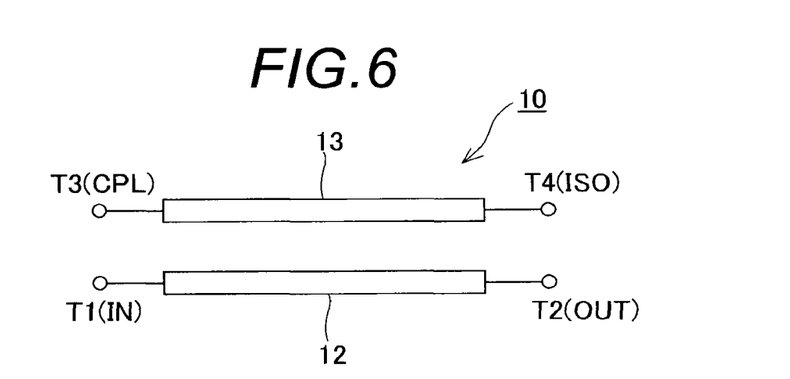
FIG. 6 is a circuit diagram conceptually illustrating a coupler according to a comparative example.
Figure 7:
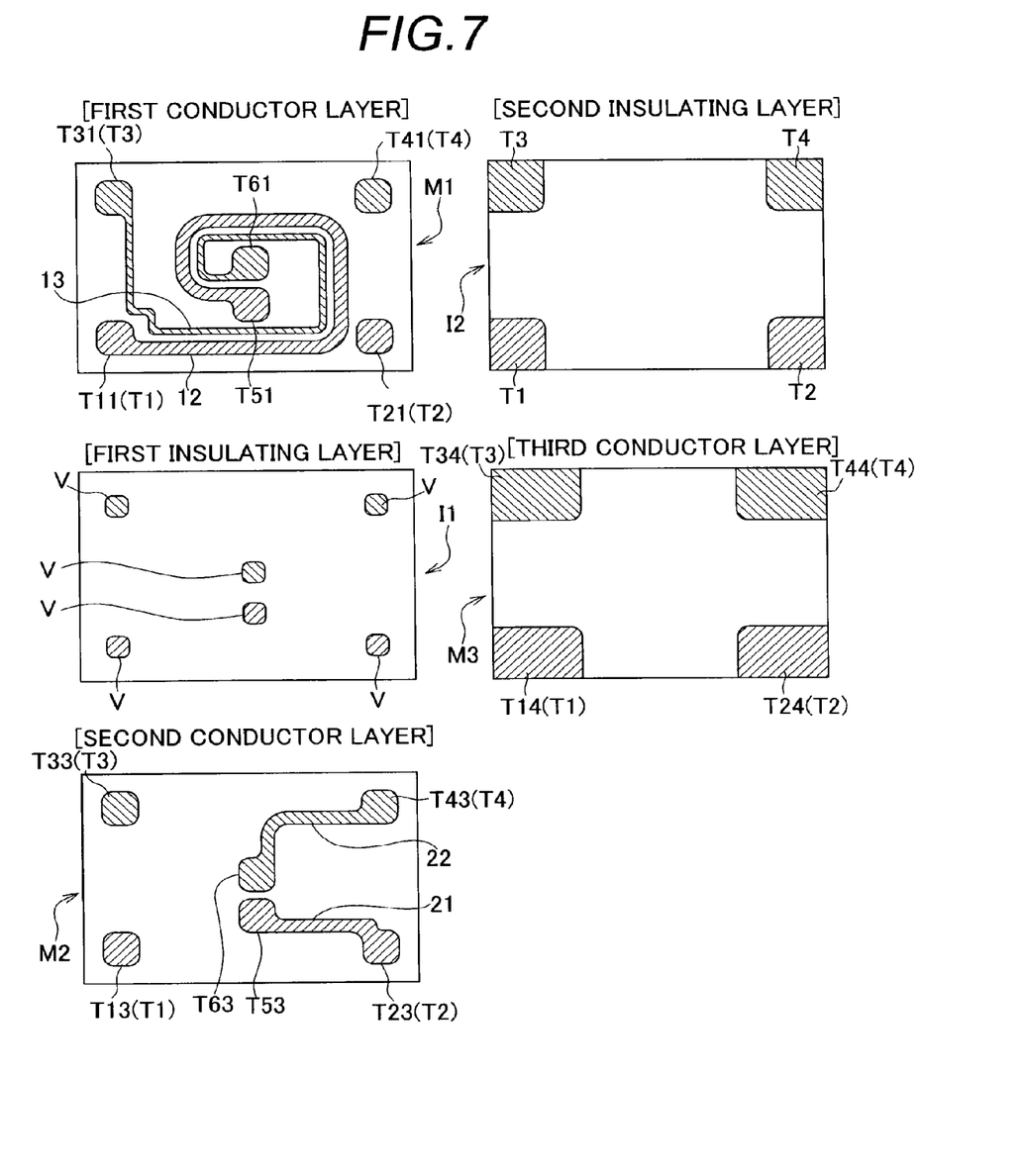
FIG. 7 includes horizontal sectional views illustrating the coupler according to the comparative example (plan views illustrating respective conductor layers and respective insulator layers of a laminate which forms part of the coupler)

FIG. 6 is a circuit diagram illustrating a coupler (comparative example) which is configured for comparison with the present invention, and FIG. 7 includes horizontal sectional views of the coupler according to the comparative example (plan views illustrating respective conductor layers and insulating layers). As illustrated in these figures, the coupler 10 of the comparative example comprises a main line 12 connected between an input terminal T1 and an output terminal T2, and a sub-line 13 connected between a coupling terminal T3 and an isolation terminal T4. The main line 12 and sub-line 13 are routed within a laminate such that they are electromagnetically coupled with each other. The laminate includes a first conductor layer M1, a first insulating layer I1, a second conductor layer M2, a second insulating layer I2, and a third conductor layer M3, which are laminated in order, where the main line 12 and sub-line 13 are routed on the first conductor layer M1.

In regard to differences in structure of the respective layers within the laminate between the present invention and the comparative example, a coupler 11 of an embodiment according to the present invention comprises two conductor layers (first conductor layer M1 and second conductor layer M2) on which a main line (main-line sections 12a, 12b) and a sub-line (sub-line sections 13a, 13b) are routed, while the coupler 10 of the comparative example comprises only one layer (first conductor layer M1). In the remaining structure, the coupler 10 of the comparative example is similar to the coupler 11 of the embodiment (same or comparative portions are labeled with the same reference numerals). Since the structure of the respective layers will be described in detail in DESCRIPTION OF THE EMBODIMENT, a description is omitted here on the remaining structure.

Figure 8:
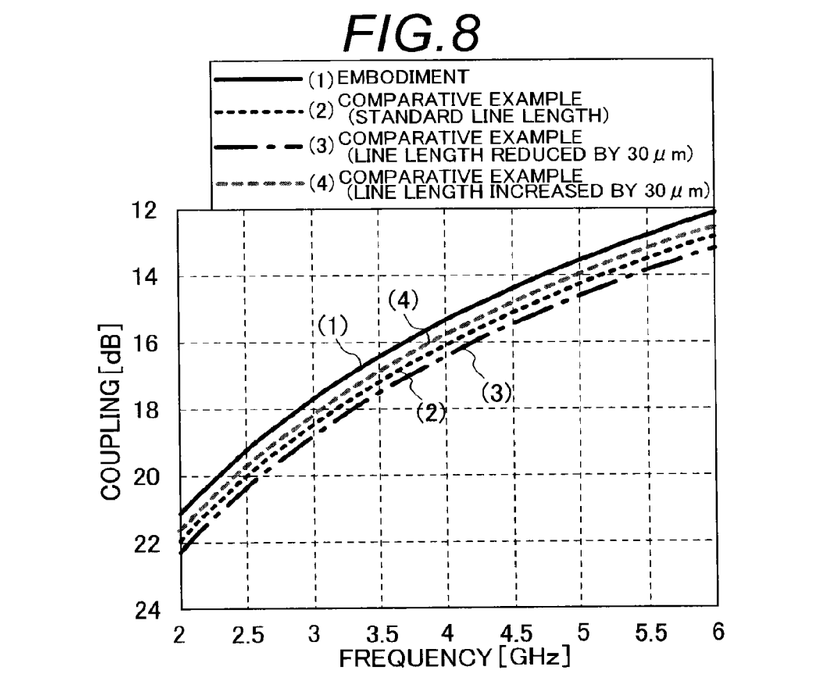
FIG. 8 is a graph representing the frequency characteristic for the coupling when a main line and a sub-line are varied in line length in the coupler according to the comparative example.
Figure 9:
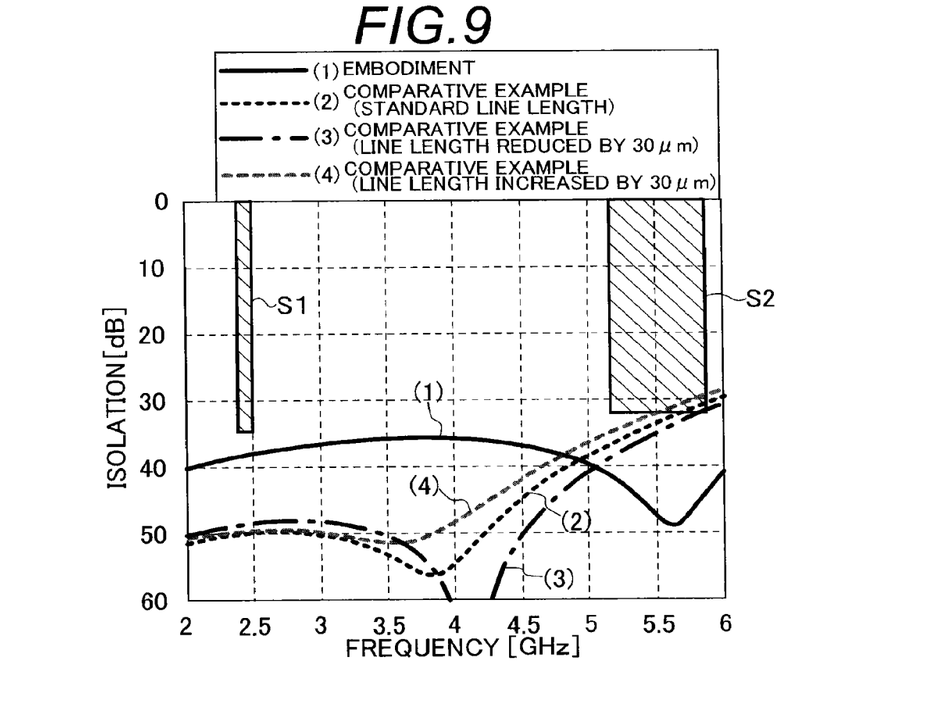
FIG. 9 is a graph representing the frequency characteristic for the isolation when the main line and sub-line are varied in line length in the coupler of the comparative example in a manner similar to FIG. 8.

FIGS. 8 and 9 are graphs respectively representing the frequency characteristics for the coupling (FIG. 8) and the isolation (FIG. 9) when the line lengths of the main line and sub-line (they are sometimes referred to collectively as the "coupled lines" or "both lines") are changed in the coupler of the comparative example. In these graphs, a black broken line (2) represents the frequency characteristic when both lines have a standard line length (680 μm), a one-dot-chain line (3) represents the frequency characteristic when the line length of both lines is reduced by 30 μm from the standard length, and a gray broken line (4) represents the frequency characteristic when the line length of both lines are increased by 30 μm from the standard line length. These FIGS. 8 and 9 (the same applies to FIGS. 10-13, later described) also represent the characteristics of the coupler of the embodiment, later described (represented by solid lines). Further, the characteristic graph for the isolation illustrates a required specification S1 on the lower frequency region (35 dB or more in a frequency range of 2.4 GHz-2.5 GHz) and a required specification S2 on the higher frequency region (32 dB or more in a frequency range of 5.15 GHz-5.85 GHz).

As can be seen from FIGS. 8 and 9, as the coupled lines are made longer, the coupling becomes higher, but an attenuation pole (resonant point) of isolation shifts to a lower side (to a lower frequency side). For this reason, when the line length is made longer in order to increase the coupling, it becomes difficult to satisfy the required specification S2 related to the isolation which is set on the higher side (higher frequency side). Conversely, as the coupled lines are made shorter, the attenuation pole of isolation shifts to the higher side to facilitate satisfying the required specification S2 on the higher side, but the coupling is reduced. In this way, it is difficult to satisfy both the coupling and isolation only with a change in line length.

Figure 10:
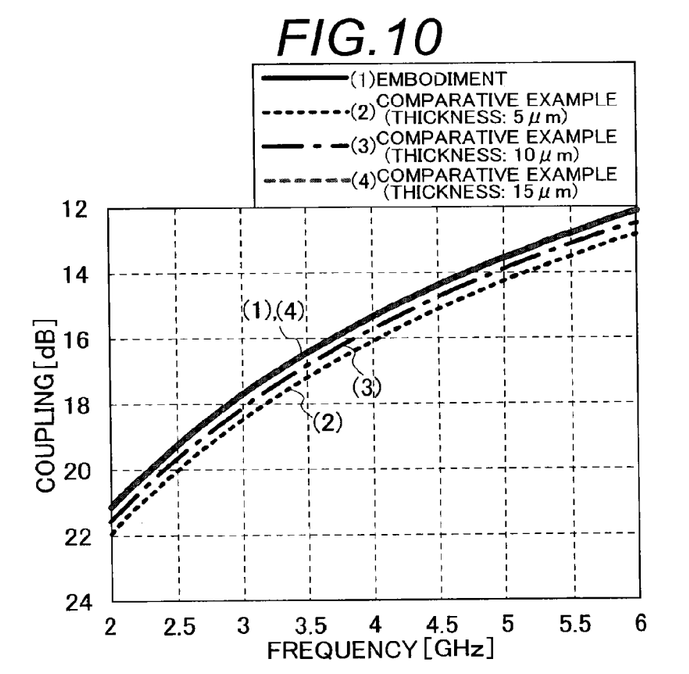
FIG. 10 is a graph representing the frequency characteristic for the coupling when the main line and sub-line are varied in thickness in the coupler according to the comparative example.
Figure 11:
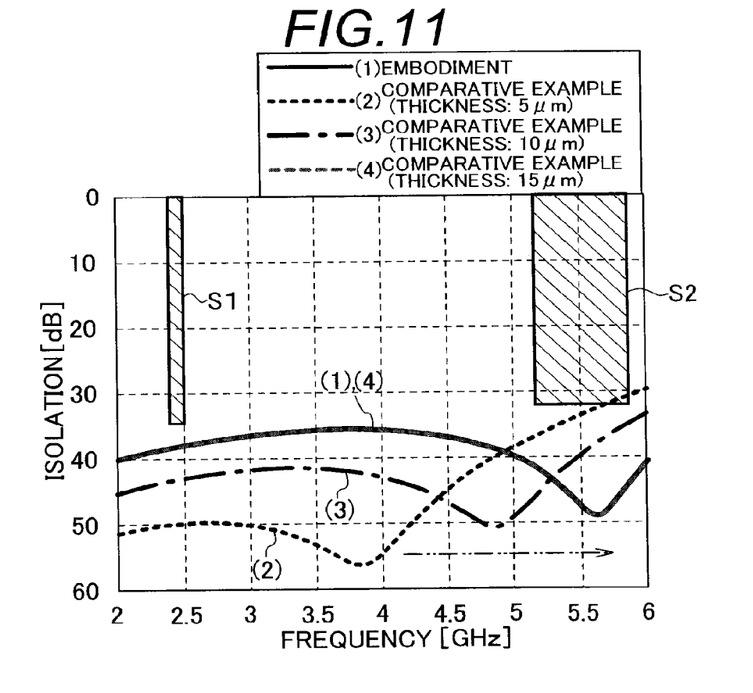
FIG. 11 is a graph representing the frequency characteristic for the isolation when the main line and sub-line are varied in thickness in the coupler according to the comparative example in a manner similar to FIG. 10.

FIGS. 10 and 11 are graphs respectively representing the frequency characteristics for the coupling (FIG. 10) and the isolation (FIG. 11) when the thickness of the coupled lines is changed in the coupler of the comparative example, where a black broken line (2) represents the frequency characteristic when the thickness of both lines is set to 5 μm, a one-dot-chain line (3) represents the frequency characteristic when the thickness is set to 10 μm, and a gray broken line (4) (matching with a solid line (1) representing the frequency characteristic of the embodiment) represents the frequency characteristic when the thickness is set to 15 μm, respectively.

As can be seen from FIGS. 10 and 11, as the coupled lines are increased in thickness, the coupling becomes higher, and the attenuation pole of isolation shifts to the higher side, as opposed to the foregoing case where the line length is changed (see a two-dot chain line arrow in FIG. 11). Accordingly, it is envisaged that the required specifications S1, S2 can be satisfied by tuning both the length and thickness of the coupled lines to freely set the frequency position for the attenuation pole of isolation.

However, to make the coupled lines thicker, a longer time is taken for deposition, leading to a lower production efficiency. Also, a larger thickness results in larger variations in thickness of respective products, leading to a lower production yield. Such an increase in thickness of the coupled lines is also limited from a manufacturing point of view.

Figure 12:
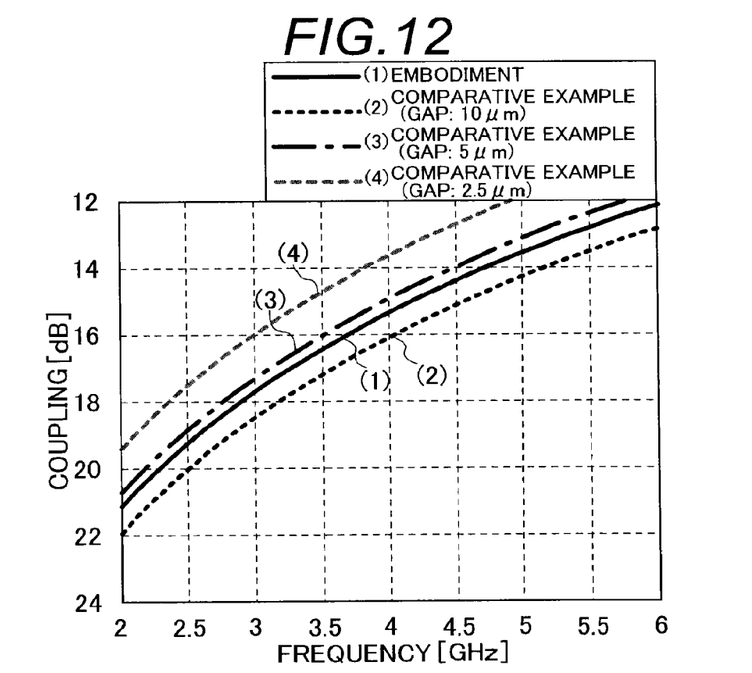
FIG. 12 is a graph representing the frequency characteristic for the coupling when the gap between the main line and sub-line is narrowed in the coupler according to the comparative example.
Figure 13:
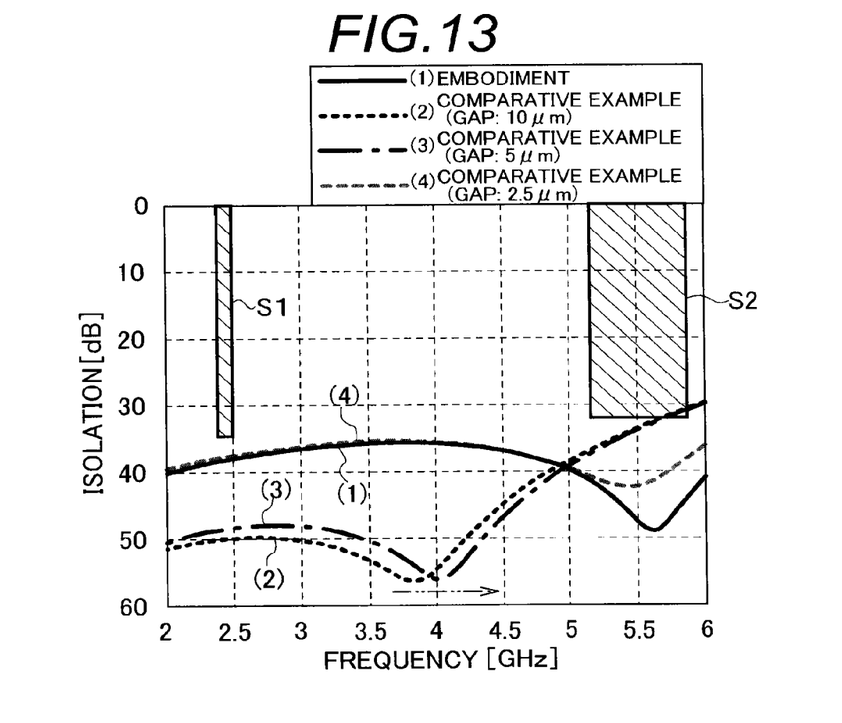
FIG. 13 is a graph representing the frequency characteristic for the isolation when the gap between the main line and sub-line is narrowed in the coupler according to the comparative example in a manner similar to FIG. 12.

FIGS. 12 and 13 are graphs respectively representing the frequency characteristics for the coupling (FIG. 12) and the isolation (FIG. 13) when the gap between the coupled lines is narrowed in the coupler of the comparative example, where a black broken line (2) represents the frequency characteristic when the gap is set to 10 μm, a one-dot-chain line (3) represents the frequency characteristic when the gap is set to 5 μm, and a gray broken line (4) represents the frequency characteristic when the gap is set to 2.5 μm, respectively. For reference, the gap between both lines is set to 10 μm in the foregoing FIGS. 8-11.

As can be seen from FIGS. 12 and 13, as the gap between the coupled lines is narrowed down, the coupling becomes higher, and the attenuation pole of isolation shifts to the higher side. Accordingly, as with the case with the thickness, it is envisaged that both the coupling and isolation can be freely adjusted by tuning both the length and gap of both lines.

However, this strategy also involves limitations from the manufacturing point of view. This is because both lines are more susceptible to short-circuiting as the line gap is made narrower. Also, as can be seen from FIG. 13, since a narrower line gap causes the attenuation pole to shift by a larger amount, accurate adjustment becomes more difficult at higher frequencies, making the quality more susceptible to variations.

The invention described in the foregoing Patent Document 1 (JP-A-2002-280810) is intended to solve a problem of exacerbated isolation due to insufficient self-inductance value of a main line and a sub-line (particularly, the sub-line) to the accompaniment of a reduction in size of a coupler. More specifically, the width of the sub-line is made relatively smaller than that of the main line, and the main line is made thicker than the sub-line in order to suppress an insertion loss. However, the invention described in this document is not capable of simultaneously adjusting the coupling and isolation. Also, when the thickness of the main line is made lager, as in the invention described in Patent Document 1, this can give rise to the aforementioned problem related to the manufacturing. Specifically, a long time is taken for deposition, leading to a lower manufacturing efficiency, and a thicker film thickness causes larger variations in thickness of respective products, resulting in a lower manufacturing yield.

It is therefore an object of the present invention to provide a novel coupler structure which is capable of being satisfactorily adjusted for the coupling and isolation, and excels in a high productivity.

To solve the foregoing problem and achieve the object, a coupler (directional coupler) according to the present invention comprises a main line capable of transmitting a high-frequency signal; an input terminal disposed at one end of the main line for introducing the high-frequency signal into the main line; an output terminal disposed at the other end of the main line for delivering the high-frequency signal from the main line; a sub-line electromagnetically coupled to the main line for extracting a portion of the high-frequency signal; a coupling terminal disposed at one end of the sub-line; and an isolation terminal disposed at the other end of the sub-line, where the lines and terminals are disposed within a laminate having a plurality of conductor layers laminated with an insulating layer disposed between respective ones of the conductor layers.

Also, the main line includes a first main-line section formed on a first conductor layer within the plurality of conductor layers, and a second main-line section formed on a second conductor layer within the plurality of conductor layers, where the first main-line section and the second main-line section are electrically connected in parallel with each other between the input terminal and the output terminal. The sub-line, on the other hand, includes a first sub-line section formed on the first conductor layer, and a second sub-line section formed on the second conductor layer, wherein the first sub-line section and the second sub-line section are electrically connected in parallel with each other between the coupling terminal and the isolation terminal.

Then, the first main-line section and the first sub-line section are disposed in close proximity to each other to generate electromagnetic coupling therebetween, and the second main-line section and the second sub-line section are disposed in close proximity to each other to generate electromagnetic coupling therebetween.

In the coupler of the present invention, the main line and sub-line are configured to include two line sections connected in parallel which are electromagnetically coupled to each other. With such a structure, the coupling and isolation characteristic can be achieved equivalently to those lines that are increased in thickness, even without varying the thickness of the respective line sections, as shown later in DESCRIPTION OF THE EMBODIMENTS. Also, since the coupled lines are made up of a plurality of line sections routed on separate conductor layers, the respective line sections need not be increased in thickness, thus making it possible to prevent the aforementioned manufacturing-related problems (long time required for deposition, and variations in thickness). Consequently, it is possible to mass produce accurate couplers with high efficiency and good yield. Further, since the main line is composed of a plurality of line sections connected in parallel, the insertion loss can be kept low as well.

As a typical implementation of the main-line sections and sub-line sections, the first main-line section and the second main-line section have substantially the same plane shape, and are disposed to overlay one above the other. Similarly, the first sub-line section and the second sub-line section also have substantially the same plane shape, and are disposed to overlay one above the other, as viewed in plane.

Further in the present invention or the above aspect, the first main-line section may have an end on an input terminal side electrically connected to an end of the second main-line section on an input terminal side through a first inter-layer connection conductor extending in a laminating direction of the laminate. The first main-line section may have an end on an output terminal side electrically connected to an end of the second main-line section on an output terminal side through a second inter-layer connection conductor extending in the laminating direction of the laminate. The first sub-line section may have an end on a coupling terminal side electrically connected to an end of the second sub-line section on a coupling terminal side through a third inter-layer connection conductor extending in the laminating direction of the laminate. The first sub-line section may have an end on an isolation terminal side electrically connected to an end of the second sub-line section on an isolation terminal side through a fourth inter-layer connection conductor extending in the laminating direction of the laminate.

Also, in another aspect of the present invention, an attenuation pole is formed in a frequency characteristic of isolation, wherein the attenuation pole is positioned within a frequency range associated with a required specification on a higher frequency side, thereby satisfying both of a required specification on a lower frequency side and the required specification on the higher frequency side. According to such an implementation, high isolation can be achieved in a high frequency region in which isolation is particularly susceptible to deterioration. thus making it possible to favorably satisfy both of the required specification on the lower frequency side and the required specification on the higher frequency side, which are required to the coupler.

For tuning the frequency position of the attenuation pole, the respective line sections may be adjusted in thickness. According to the present invention or respective aspects described above, since the coupled lines are composed of a plurality of line sections routed on separate conductor layers, the respective line sections need not be varied in thickness, or need not be made so thick, even if varied. Accordingly, the aforementioned manufacturing-related problems (long time taken for deposition and variations in thickness) can be prevented from occurring.

A wireless communication device according to the present invention comprises a transmitter circuit capable of generating a transmission signal, and including a PA (power amplifier) for amplifying the transmission signal, and an APC circuit (automatic power control circuit) for controlling the power of the power amplifier; a receiver circuit capable of processing a received signal; an antenna for receiving/transmitting the transmission signal/received signal; a switch connected between the antenna and the transmitter circuit and the receiver circuit for delivering the received signal received through the antenna to the receiver circuit, and delivering the transmission signal output from the transmitter circuit to the antenna; and a coupler for detecting the level of the transmission signal delivered from the PA and supplying the detection signal to the APC circuit. The wireless communication device is configured to control the power of the PA based on the detection signal supplied from the coupler, where the coupler may be the coupler according to the present invention or any of the aspects described above.

According to the present invention, it is possible to provide a novel coupler which is capable of being satisfactorily adjusted for the coupling and isolation, and excels in a high productivity.

BRIEF DESCRIPTION OF THE DRAWINGS

Other objects and features of the present invention will become apparent from the following detailed description considered in connection with the accompanying drawings.

In the drawings, wherein similar reference characters denote similar elements throughout the several views.

DESCRIPTION OF THE EMBODIMENTS

Figure 1:
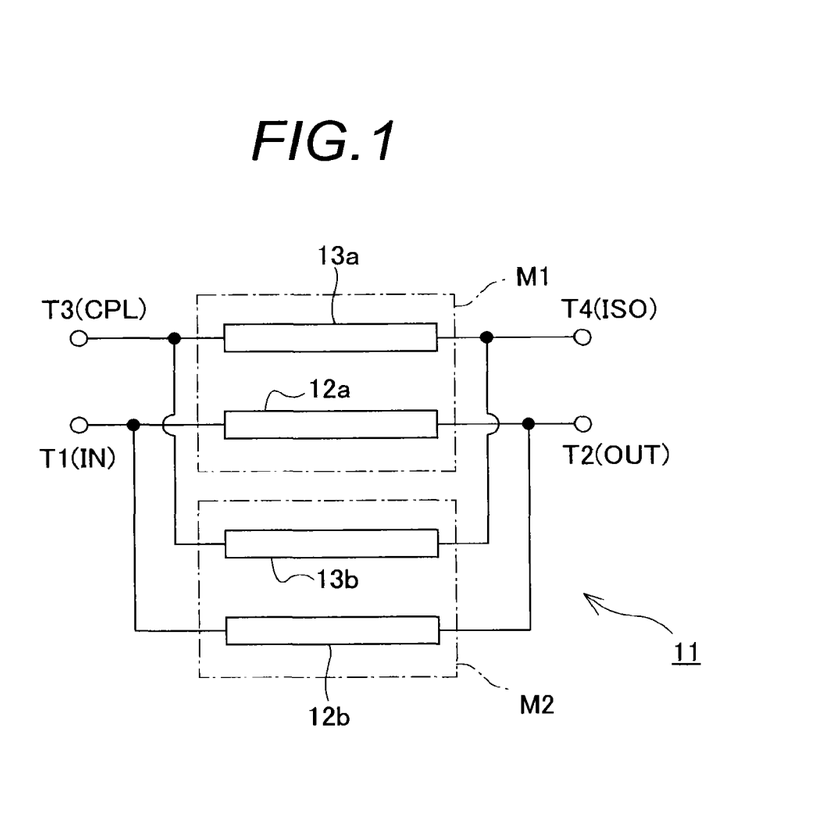
FIG. 1 is a circuit diagram conceptually illustrating a coupler according to one embodiment of the present invention.

As illustrated in FIG. 1, a coupler 11 according to one embodiment of the present invention comprises a main line for transmitting a transmission signal, and a sub-line electromagnetically coupled to the main line, where the main line has a first main-line section 12a and a second main-line section 12b connected in parallel between an input terminal T1 and an output terminal T2, while the sub-line has a first sub-line section 13a and a second sub-line section 13b connected in parallel between a coupling terminal T3 and an isolation terminal T4. Also, the first main-line section 12a is disposed in close proximity to the first sub-line section 13a to cause them to electromagnetically couple to each other, while the second main-line section 12b is similarly disposed in close proximity to the second sub-line section 13b to cause them to electromagnetically couple to each other.

The main-line sections 12a, 12b and sub-line sections 13a, 13b, as well as terminals T1-T4 are arranged in a laminate which comprises a plurality of conductor layers laminated with an insulating layer interposed between the respective ones of the conductor layers, to implement the coupler 11 of the embodiment as a one-chip electronic component.

Figure 2:
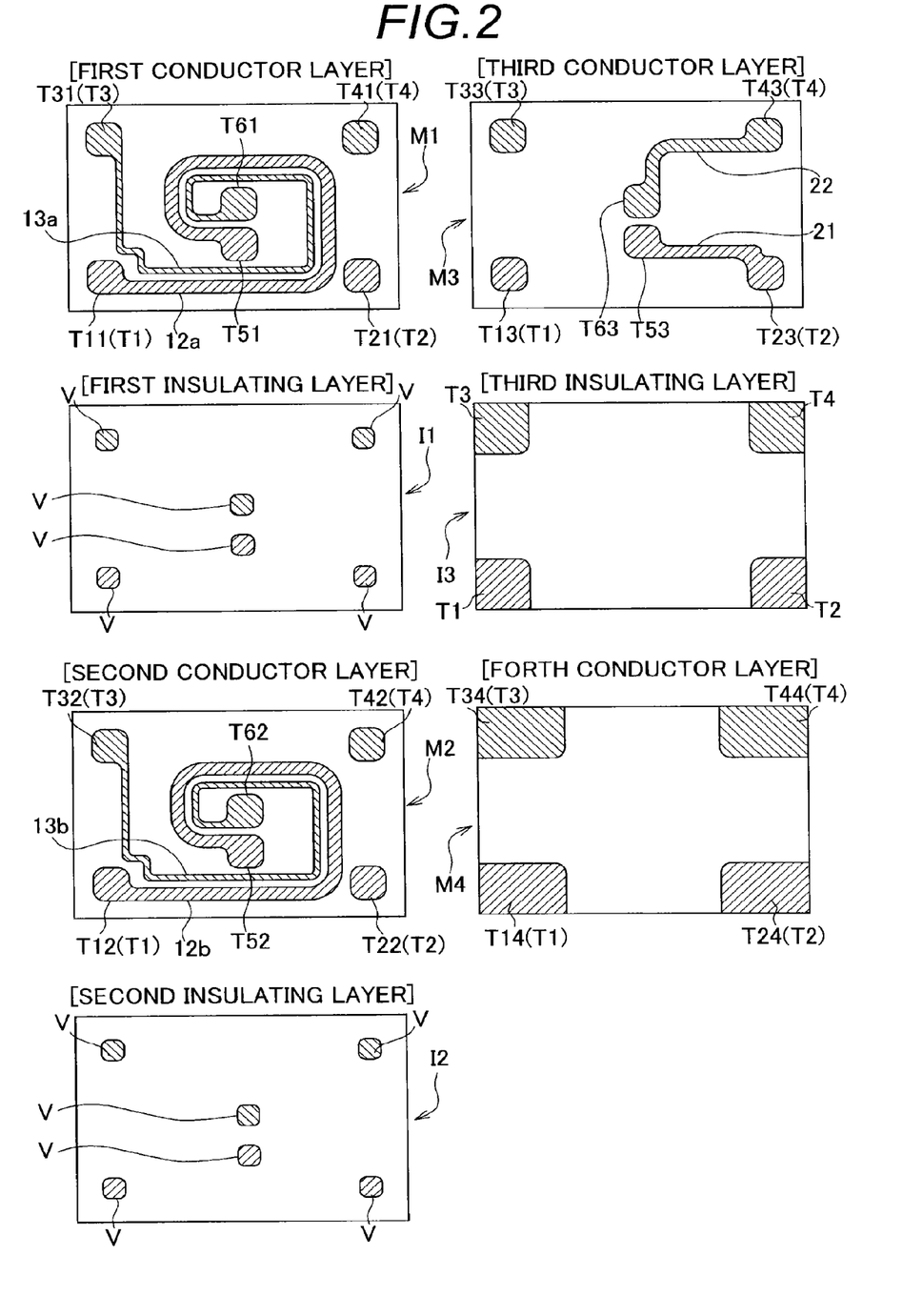
FIG. 2 includes horizontal sectional views illustrating the coupler according to the embodiment (plan views illustrating respective conductor layers and respective insulator layers of a laminate which forms part of the coupler)

Specifically, as illustrated in FIG. 2, the laminate has a rectangular geometry, as viewed in plane, and has a first conductor layer M1, a first insulating layer I1, a second conductor layer M2, a second insulating layer I2, a third conductor layer M3, a third insulating layer I3, and a fourth conductor layer M4, which are laminated in order. Additionally, the coupler 11 according to the embodiment may comprise other conductor layers and insulating layers, not shown, for example, a conductor layer including a ground electrode, and the like, other than the respective layers illustrated in FIG. 2.

At each of four corners of the laminate (four corners when viewed in plane), the laminate has a columnar conductor which extends vertically through the laminate (in a laminating direction of the laminate) from the first conductor layer M1 through the fourth conductor layer M4. These conductors comprise terminal zones T11-T14, T21-T24, T31-T34, T41-T44, appearing on the conductor layers M1-M4, respectively, and columnar terminals T1-T4 including vias V extending through the insulating layers. When designating the adjacent corners as a first through a fourth corner from the lower left corner of each layer in the counter-clockwise direction in FIG. 2, the columnar input terminal T1 is positioned at the first corner; the columnar output terminal T2 at the second corner; the columnar isolation terminal T4 at the third corner; and the columnar coupling terminal T3 at the fourth corner of the four corners.

The respective columnar terminals T1-T4 appear as terminal zones on the first conductor layer M1, second conductor layer M2, third conductor layer M3, and fourth conductor layer M4. Specially, on each of the first through fourth conductor layers M1-M4, the input terminal zones T11, T12, T13, T14 appear at the first corner; the output terminal zones T21, T22, T23, T24 at the second corner; the isolation terminal zones T41, T42, T43, T44 at the third corner; and the coupling terminal zones T31, T32, T33, T34 at the fourth corner, respectively. The corresponding terminal zones on the respective conductor layers (for example, the input terminal zones T11, T12, T13, T14, and likewise for the remaining terminal zones) are electrically connected through square-shaped vias V which extend vertically through the insulating layers.

The first main-line section 12a which forms part of the main line, and the first sub-line section 13a which forms part of the sub-line are routed on the first conductor layer M1. Specifically, the first main-line section 12a is formed to spirally extend from the first corner of the first conductor layer M1 toward the center of the first conductor layer M1. The first main-line section 12a has one end connected to the input terminal zone T11, and the other end connected to a main-line draw-out terminal T51 (a terminal for connecting the main line to the output terminal T2) disposed in a central area of the first conductor layer M1, respectively.

The first sub-line section 13a, in turn, is routed from the fourth corner to the first corner of the first conductor layer M1, and is formed to spirally extend from the first corner toward the center of the first conductor layer M1, in a manner similar to the first main-line section 12a, and run in parallel with the first main-line section 12a inside the first main-line section 12a (extends in parallel with the first main-line section 12a). The first sub-line section 13a is spaced away from the first main-line section 12a by a certain gap in order to generate electromagnetic coupling therebetween.

Notably, when the first sub-line section 13a is routed inside the first main-line section 12a in this way, the first main-line section 12a ends up to intervene between the first sub-line section 13a and the terminal zones (output terminal zone T21, isolation terminal zone T41 and coupling terminal zone T31), thus making it possible to suppress undesired electromagnetic coupling of the first sub-line section 13a with the terminal zones T21, T31, T41 (particularly, with the output terminal zone T21 which exerts significant influences), and consequently prevent the isolation characteristic from deteriorating (the same applies to the second sub-line section 13b, later described). In this respect, the Applicant has previously filed a patent application (Japanese Patent Application No. 2015-34066).

The first sub-line section 13a has one end connected to the coupling terminal zone T31 at the fourth corner, and the other end connected to a terminal (sub-line draw-out terminal) T61, which is different from the main-line draw-out terminal T51, disposed in the central area of the first conductor layer M1.

The second main-line section 12b, which constitutes the main line together with first main-line section 12a, and the second sub-line section 13b, which constitutes the sub-line together with the first sub-line section 13a, are routed on the second conductor layer M2 which is laminated over the first conductor layer M1 through the first insulating layer I1, where the second conductor layer M2 has the same conductor pattern as the first conductor layer M1. Accordingly, the second main-line section 12b has the same plane shape as the first main-line section 12a, and the second sub-line section 13b has the same plane shape as the first sub-line section 13a, where when viewed in plane (in the laminating direction of the laminate), the first main-line section 12a overlays just above the second main-line section 12b, and the first sub-line section 13a overlays just above the second sub-line section 13b. Likewise, the respective terminal zones T11, T12; T21, T22; T32, T32; and T41, T42 have the same plane shape on the first conductor layer M1 and second conductor layer M2, and one overlays just above the other when viewed in plane.

In regard to the thicknesses of the respective layers in the laminate, in this embodiment, the thickness of the respective conductive layers M1-M3, except for the fourth conductor M4 (as such, the main-line sections 12a, 12b and sub-line sections 13a, 13b as well), and the respective insulating layers I1-I3 are all set to 5 µm. The thickness of the fourth conductor layer M4 is set to 20 µm.

The input terminal zone T11 on the first conductor layer M1 is connected to the input terminal zone T12 on the second conductor layer M2 through a via V (first inter-layer connection conductor). In this way, the end of the first main-line section 12a on the input terminal side is electrically connected to the end of the second main-line section 12b on the input terminal side. Likewise, the main-line draw-out terminal T51 on the first conductor layer M1 is connected to the main-line draw-out terminal T52 on the second conductor layer M2 through a via V (second inter-layer connection conductor), thereby electrically connecting the end of the first main-line section 12a on the output terminal side to the end of the second main-line section 12b on the output terminal side.

Further, the coupling terminal zone T31 on the first conductor layer M1 is connected to the coupling terminal zone T32 on the second conductor layer M2 through a via V (third inter-layer connection conductor), thereby electrically connecting the end of the first sub-line section 13a on the coupling terminal side to the end of the second sub-line section 13b on the coupling terminal side. Likewise, the sub-line draw-out terminal T61 on the first conductor layer M1 is connected to the sub-line draw-out terminal T62 on the second conductor layer M2 by a via V (fourth inter-layer connection conductor), thereby electrically connecting the end of the first sub-line section 13a on the isolation terminal side to the end of the second sub-line section 13b on the isolation terminal side.

The connection of the respective main-line sections 12a, 12b to the columnar output terminal T2, and the connection of the respective sub-line sections 13a, 13b to the columnar isolation terminal T4 are made on the third conductor layer M3 which is laminated over the second conductive layer M2 through the second insulating layer I2. Specifically, in a central area of the third conductor layer M3, a main-line draw-out terminal T53 is similarly disposed at the same position as the main-line draw-out terminal T52 disposed on the second conductor layer M2, when viewed in plane, and the main-line draw-out terminals T52, T53 disposed on the second conductor layer M2 and third conductive layer M3, respectively, are connected to each other through a via V which extends vertically through the second insulating layer I2. Likewise, in a central area of the third conductor layer M3, a sub-line draw-out terminal T63 is disposed at the same position as the sub-line draw-out terminal T62 disposed on the second conductor layer M2, when viewed in plane, and these sub-line draw-out terminals T62, T63 disposed on the second conductive layer M2 and third conductive layer M3, respectively, are connected to each other through another via V which extends vertically through the second insulating layer I2.

Then, the other end of the main-line connection line 21, having one end connected to the columnar output terminal T2 (the output terminal zone T23 appearing at the second corner of the third conductor layer M3) on the third conductor layer M3, is connected to the main-line draw-out terminal T53 in a central area of the third conductor layer M3. Also, the other end of the sub-line connection line 22, having one end connected to the columnar isolation terminal T4 (the isolation terminal zone T43 appearing at the third corner of the third conductor layer M3) on the third conductor layer M3, is connected to the sub-line draw-out terminal T63 in the central area of the third conductor layer M3.

According to the coupler of the embodiment as described above, as can be seen from FIGS. 10 and 11, it is possible to provide a satisfactory isolation characteristic which satisfies the required specification S1 on the lower frequency region and the required specification S2 on the higher frequency region, while ensuring the coupling equivalent to the comparative example which has the thickness of both lines increased to 15 µm (in FIGS. 10 and 11, the solid line (1) representing the characteristic of the embodiment matches with the gray broken line (4) representing the characteristic of the comparative example with the thickness of 15 µm). Moreover, the respective line sections 12a, 12b, 13a, 13b are 5 µm thick and need not be particularly increased in thickness, so that highly accurate coupler can be efficiently produced with smaller variations without suffering from the aforementioned manufacturing-related problem. Also, since the main line is composed of the two main-line sections 12a, 12b connected in parallel, the insertion loss can be kept low as well.

Figure 3:
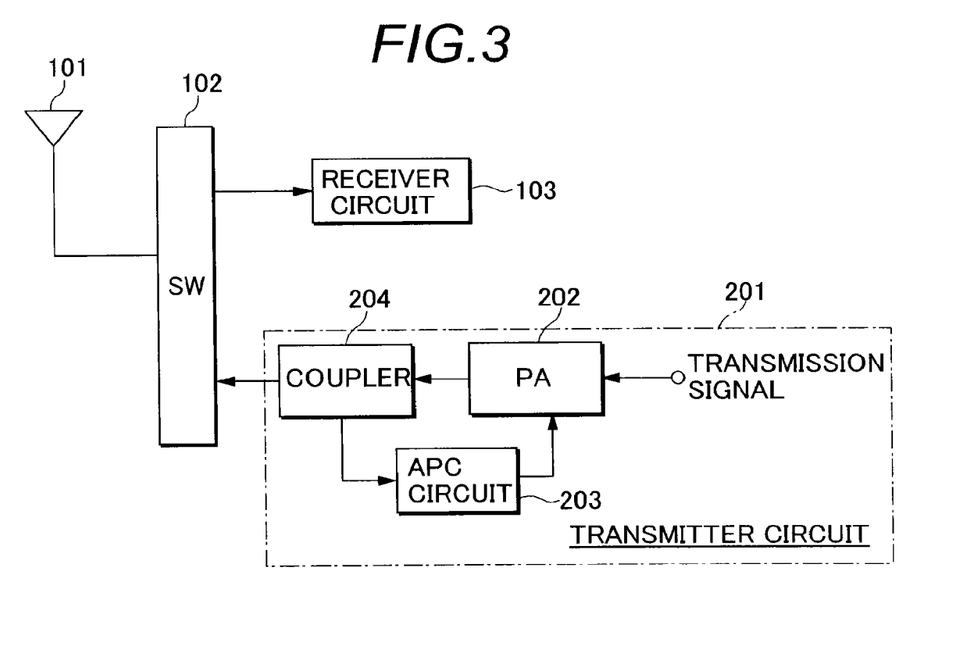
FIG. 3 is a block diagram illustrating an exemplary wireless communication device according to the present invention.

FIG. 3 is a block diagram illustrating an exemplary wireless communication device according to the present invention. As illustrated in FIG. 3, this wireless communication device comprises a transmitter circuit 201 for generating a transmission signal; a receiver circuit 103 for processing a received signal; an antenna 101 for receiving/transmitting a transmission signal/received signal; and a switch 102 connected between the antenna 101 and the transmitter circuit 201 and receiver circuit 103 for delivering a received signal received through the antenna 101 to the receiver circuit 103 and delivering a transmission signal output from the transmitter circuit 201 to the antenna 101.

The transmitter circuit 201 includes a PA (power amplifier) 202 for amplifying a transmission signal; an APC circuit (automatic power control circuit) 203 for controlling the power of the PA 202; and a coupler 204 for detecting the level of a transmission signal output from the PA 202, where the coupler 204 is implemented by the coupler according to the foregoing embodiment. The coupler 204 detects the level of a transmission signal output from the PA 202, and delivers the detection signal to the APC circuit 203. The APC circuit 203 controls the gain of the PA 202 based on the detection signal delivered from the coupler 204 such that the power of the PA 202 remains constant.

In this device, since the coupler 204 is implemented by the coupler 11 according to the embodiment which exhibits a satisfactory isolation characteristic, the PA 202 can be more accurately controlled for the power.

While an embodiment of the present invention has been described above, it should be apparent to those skilled in the art that the present invention is not limited to the embodiment described above, but can be subjected to a variety of changes within the scope of the appended claims.

Figure 4:
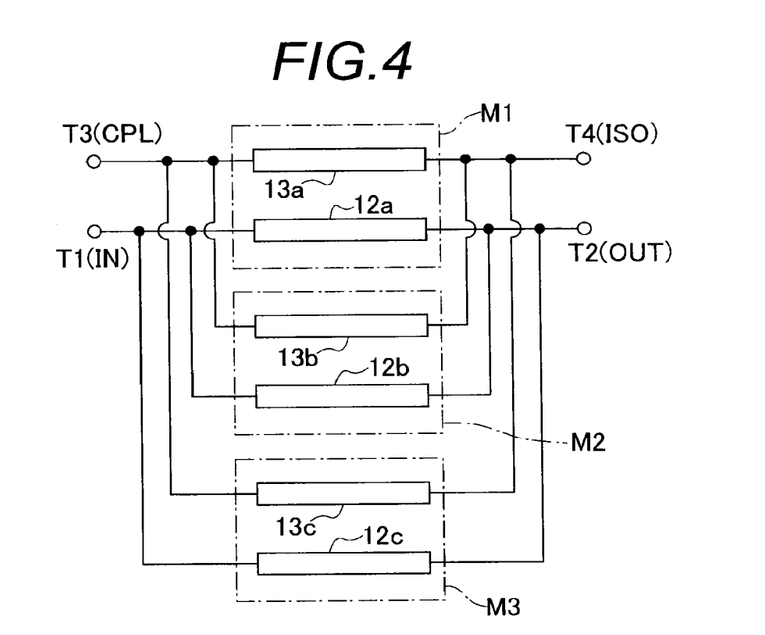
FIG. 4 is a circuit diagram conceptually illustrating another exemplary configuration of the coupler according to the embodiment.
Figure 5:
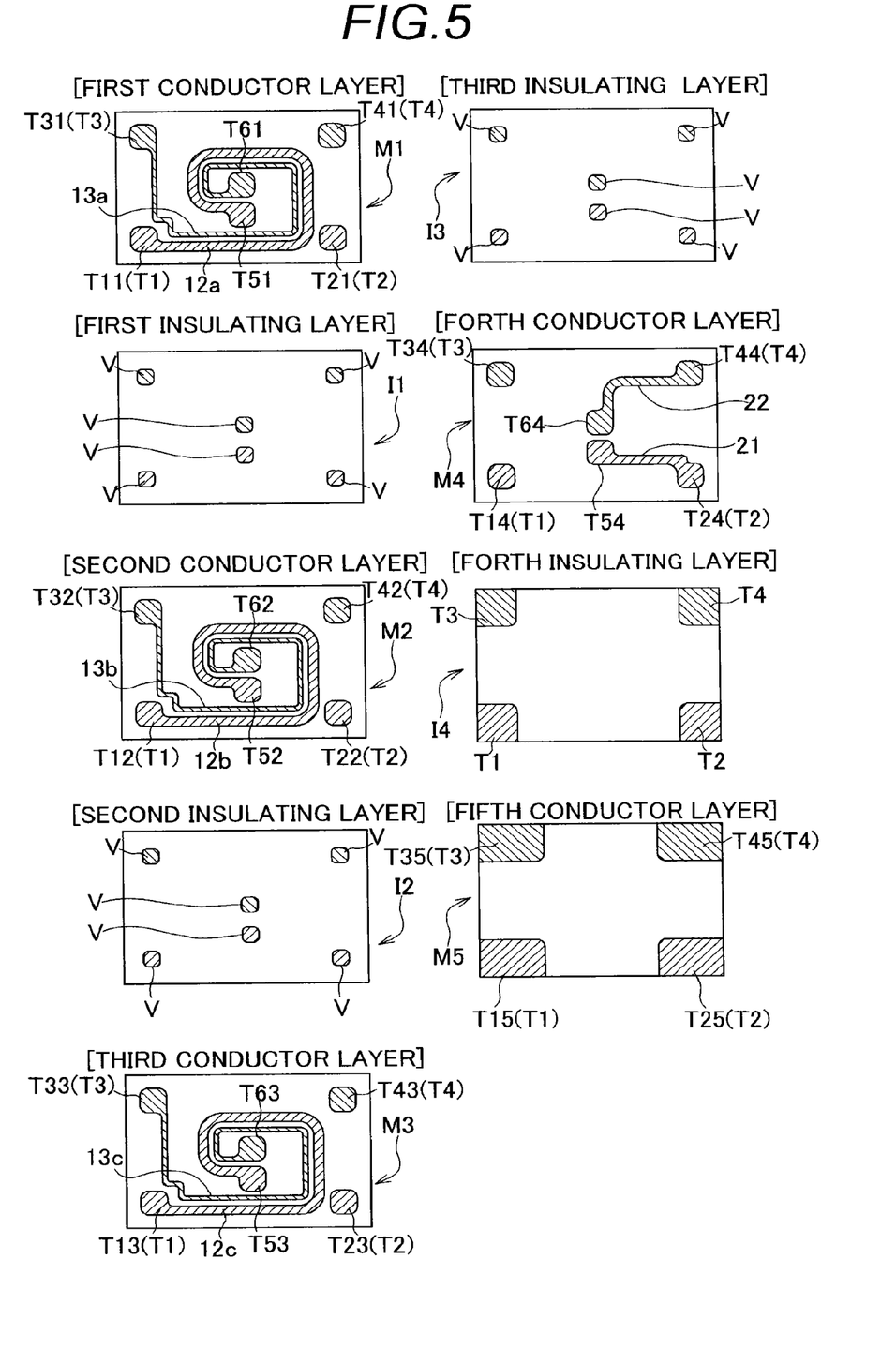
FIG. 5 includes horizontal sectional views illustrating the coupler of the other exemplary configuration (plan views illustrating respective conductor layers and respective insulator layers of a laminate which forms part of the coupler)

For example, while the main line and sub-line are respectively composed of two line sections in the foregoing embodiment, both lines may be composed of three or four or more line sections in the present invention. FIGS. 4 and 5 illustrate an example which comprises three line sections for the main line and sub-line, respectively. In this example, there are three main-line sections (first main-line section 12a, second main-line section 12b, and third main-line section 12c) connected in parallel between an input terminal T1 and an output terminal T2, and three sub-line sections (first sub-line section 13a, second sub-line section 13b, and third sub-line section 13c) connected in parallel between a coupling terminal T3 and an isolation terminal T4. The main-line sections and sub-line sections are coupled respectively on each of a first conductor layer M1, a second conductor layer M2, and a third conductor layer M3.

Also, the wireless communication device of the present invention is not limited to the example illustrated in FIG. 3, but may employ a variety of circuit configuration, other than the above, for example, a multi-band device which can utilize a plurality of frequency bands.

What is claimed is:

1. A directional coupler comprising:
    a main line configured to transmit a high-frequency signal;
    an input terminal disposed at one end of said main line configured to introduce the high-frequency signal into said main line;
    an output terminal disposed at the other end of said main line configured to deliver the high-frequency signal from said main line;
    a sub-line electromagnetically coupled to said main line configured to extract a portion of the high-frequency signal;
    a coupling terminal disposed at one end of said sub-line; and
    an isolation terminal disposed at the other end of said sub-line,
    said main line, said input terminal, said output terminal, said sub-line, said coupling terminal, and said isolation terminal being disposed within a laminate having a plurality of conductor layers laminated with an insulating layer disposed between respective ones of said conductor layers, wherein:
    said main line includes a first main-line section formed on a first conductor layer within said plurality of conductor layers, and a second main-line section formed on a second conductor layer within said plurality of conductor layers;
    said first main-line section and said second main-line section are electrically connected in parallel with each other between said input terminal and said output terminal;
    said sub-line includes a first sub-line section formed on said first conductor layer, and a second sub-line section formed on said second conductor layer;
    said first sub-line section and said second sub-line section are electrically connected in parallel with each other between said coupling terminal and said isolation terminal;
    said first main-line section and said first sub-line section are disposed in close proximity to each other to generate electromagnetic coupling therebetween; and
    said second main-line section and said second sub-line section are disposed in close proximity to each other to generate electromagnetic coupling therebetween.

2. The directional coupler according to claim 1, wherein:
    said first main-line section and said second main-line section have substantially the same plane shape, and are disposed to overlay one above the other; and
    said first sub-line section and said second sub-line section have substantially the same plane shape, and are disposed to overlay one above the other.

3. The directional coupler according to claim 1, wherein:
    said first main-line section has an end on an input terminal side electrically connected to an end of said second main-line section on an input terminal side through a first inter-layer connection conductor extending in a laminating direction of said laminate; and
    said first main-line section has an end on an output terminal side electrically connected to an end of said second main-line section on an output terminal side through a second inter-layer connection conductor extending in the laminating direction of said laminate;
    said first sub-line section has an end on a coupling terminal side electrically connected to an end of said second sub-line section on a coupling terminal side through a third inter-layer connection conductor extending in the laminating direction of said laminate; and
    said first sub-line section has an end on an isolation terminal side electrically connected to an end of said second sub-line section on an isolation terminal side through a fourth inter-layer connection conductor extending in the laminating direction of said laminate.

4. The directional coupler according to claim 2, wherein:
    said first main-line section has an end on an input terminal side electrically connected to an end of said second main-line section on an input terminal side through a first inter-layer connection conductor extending in a laminating direction of said laminate; and
    said first main-line section has an end on an output terminal side electrically connected to an end of said second main-line section on an output terminal side through a second inter-layer connection conductor extending in the laminating direction of said laminate;
    said first sub-line section has an end on a coupling terminal side electrically connected to an end of said second sub-line section on a coupling terminal side through a third inter-layer connection conductor extending in the laminating direction of said laminate; and
    said first sub-line section has an end on an isolation terminal side electrically connected to an end of said second sub-line section on an isolation terminal side through a fourth inter-layer connection conductor extending in the laminating direction of said laminate.

5. The directional coupler according to claim 1, comprising:
    an attenuation pole in a frequency characteristic of isolation, wherein:
    said attenuation pole is positioned within a frequency range associated with a required specification on a higher frequency side, thereby satisfying both of a required specification on a lower frequency side and the required specification on the higher frequency side.

6. The directional coupler according to claim 2, comprising:
an attenuation pole in a frequency characteristic of isolation, wherein:
said attenuation pole is positioned within a frequency range associated with a required specification on a higher frequency side, thereby satisfying both of a required specification on a lower frequency side and the required specification on the higher frequency side.

7. The directional coupler according to claim 3, comprising:
an attenuation pole in a frequency characteristic of isolation, wherein:
said attenuation pole is positioned within a frequency range associated with a required specification on a higher frequency side, thereby satisfying both of a required specification on a lower frequency side and the required specification on the higher frequency side.

8. The directional coupler according to claim 4, comprising:
an attenuation pole in a frequency characteristic of isolation, wherein:
said attenuation pole is positioned within a frequency range associated with a required specification on a higher frequency side, thereby satisfying both of a required specification on a lower frequency side and the required specification on the higher frequency side.

9. A wireless communication device comprising:
a transmitter circuit configured to generate a transmission signal, and including a power amplifier configured to amplify the transmission signal, and an automatic power control circuit configured to control a power of said power amplifier;
a receiver circuit configured to process a received signal;
an antenna configured to receive the received signal and transmit the transmission signal;
a switch connected between said antenna and said transmitter circuit and said receiver circuit configured to deliver the received signal received through said antenna to said receiver circuit and deliver the transmission signal output from said transmitter circuit to said antenna; and
a directional coupler configured to detect a level of the transmission signal delivered from said power amplifier and supply the detection signal to said automatic power control circuit,
said wireless communication device being configured to control the power of said power amplifier based on the detection signal supplied from said directional coupler,
wherein said directional coupler comprises said directional coupler according to claim 1.

10. A wireless communication device comprising:
a transmitter circuit configured to generate a transmission signal, and including a power amplifier configured to amplify the transmission signal, and an automatic power control circuit configured to control a power of said power amplifier;
a receiver circuit configured to process a received signal;
an antenna configured to receive the received signal and transmit the transmission signal;
a switch connected between said antenna and said transmitter circuit and said receiver circuit configured to deliver the received signal received through said antenna to said receiver circuit and deliver the transmission signal output from said transmitter circuit to said antenna; and
a directional coupler configured to detect a level of the transmission signal delivered from said power amplifier and supply the detection signal to said automatic power control circuit,
said wireless communication device being configured to control the power of said power amplifier based on the detection signal supplied from said directional coupler,
wherein said directional coupler comprises said directional coupler according to claim 2.

11. A wireless communication device comprising:
a transmitter circuit configured to generate a transmission signal, and including a power amplifier configured to amplify the transmission signal, and an automatic power control circuit configured to control a power of said power amplifier;
a receiver circuit configured to process a received signal;
an antenna configured to receive the received signal and transmit the transmission signal;
a switch connected between said antenna and said transmitter circuit and said receiver circuit configured to deliver the received signal received through said antenna to said receiver circuit and deliver the transmission signal output from said transmitter circuit to said antenna; and
a directional coupler configured to detect a level of the transmission signal delivered from said power amplifier and supply the detection signal to said automatic power control circuit,
said wireless communication device being configured to control the power of said power amplifier based on the detection signal supplied from said directional coupler,
wherein said directional coupler comprises said directional coupler according to claim 3.

12. A wireless communication device comprising:
a transmitter circuit configured to generate a transmission signal, and including a power amplifier configured to amplify the transmission signal, and an automatic power control circuit configured to control a power of said power amplifier;
a receiver circuit configured to process a received signal;
an antenna configured to receive the received signal and transmit the transmission signal;
a switch connected between said antenna and said transmitter circuit and said receiver circuit configured to deliver the received signal received through said antenna to said receiver circuit and deliver the transmission signal output from said transmitter circuit to said antenna; and
a directional coupler configured to detect a level of the transmission signal delivered from said power amplifier and supply the detection signal to said automatic power control circuit,
said wireless communication device being configured to control the power of said power amplifier based on the detection signal supplied from said directional coupler,
wherein said directional coupler comprises said directional coupler according to claim 4.

13. A wireless communication device comprising:
a transmitter circuit configured to generate a transmission signal, and including a power amplifier configured to amplify the transmission signal, and an automatic power control circuit configured to control a power of said power amplifier;
a receiver circuit configured to process a received signal;
an antenna configured to receive the received signal and transmit the transmission signal;

a switch connected between said antenna and said transmitter circuit and said receiver circuit configured to deliver the received signal received through said antenna to said receiver circuit and deliver the transmission signal output from said transmitter circuit to said antenna; and a directional coupler configured to detect a level of the transmission signal delivered from said power amplifier and supply the detection signal to said automatic power control circuit, said wireless communication device being configured to control the power of said power amplifier based on the detection signal supplied from said directional coupler, wherein said directional coupler comprises said directional coupler according to claim 5.

14. A wireless communication device comprising:

a transmitter circuit configured to generate a transmission signal, and including a power amplifier configured to amplify the transmission signal, and an automatic power control circuit configured to control a power of said power amplifier;

a receiver circuit configured to process a received signal;

an antenna configured to receive the received signal and transmit the transmission signal;

a switch connected between said antenna and said transmitter circuit and said receiver circuit configured to deliver the received signal received through said antenna to said receiver circuit and deliver the transmission signal output from said transmitter circuit to said antenna; and a directional coupler configured to detect a level of the transmission signal delivered from said power amplifier and supply the detection signal to said automatic power control circuit, said wireless communication device being configured to control the power of said power amplifier based on the detection signal supplied from said directional coupler, wherein said directional coupler comprises said directional coupler according to claim 6.

15. A wireless communication device comprising:

a transmitter circuit configured to generate a transmission signal, and including a power amplifier configured to amplify the transmission signal, and an automatic power control circuit configured to control a power of said power amplifier;

a receiver circuit configured to process a received signal;

an antenna configured to receive the received signal and transmit the transmission signal;

a switch connected between said antenna and said transmitter circuit and said receiver circuit configured to deliver the received signal received through said antenna to said receiver circuit and deliver the transmission signal output from said transmitter circuit to said antenna; and a directional coupler configured to detect a level of the transmission signal delivered from said power amplifier and supply the detection signal to said automatic power control circuit, said wireless communication device being configured to control the power of said power amplifier based on the detection signal supplied from said directional coupler, wherein said directional coupler comprises said directional coupler according to claim 7.

16. A wireless communication device comprising:

a transmitter circuit configured to generate a transmission signal, and including a power amplifier configured to amplify the transmission signal, and an automatic power control circuit configured to control a power of said power amplifier;

a receiver circuit configured to process a received signal;

an antenna configured to receive the received signal and transmit the transmission signal;

a switch connected between said antenna and said transmitter circuit and said receiver circuit configured to deliver the received signal received through said antenna to said receiver circuit and deliver the transmission signal output from said transmitter circuit to said antenna; and a directional coupler configured to detect a level of the transmission signal delivered from said power amplifier and supply the detection signal to said automatic power control circuit, said wireless communication device being configured to control the power of said power amplifier based on the detection signal supplied from said directional coupler, wherein said directional coupler comprises said directional coupler according to claim 8.

* * * * *